(12) United States Patent
Aisu (10) Patent No.: US 9,143,008 B2
(45) Date of Patent: Sep. 22, 2015

(54) POWER DEMAND AND SUPPLY SCHEDULING APPARATUS

(71) Applicant: Hideyuki Aisu, Kawasaki (JP)

(72) Inventor: Hideyuki Aisu, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 435 days.

(21) Appl. No.: 13/625,209

(22) Filed: Sep. 24, 2012

(65) Prior Publication Data

US 2013/0079937 A1 Mar. 28, 2013

(30) Foreign Application Priority Data

Sep. 26, 2011 (JP) ................. 2011-209721

(51) Int. Cl.
*H02J 13/00* (2006.01)
*H02J 3/00* (2006.01)
*H02J 3/14* (2006.01)

(52) U.S. Cl.
CPC ....... *H02J 13/0086* (2013.01); *H02J 2003/003* (2013.01); *H02J 2003/143* (2013.01); *Y02B 70/3216* (2013.01); *Y02B 70/3266* (2013.01); *Y04S 20/221* (2013.01); *Y04S 20/242* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,274,571 A | * | 12/1993 | Hesse et al. | 700/291 |
| 2005/0065867 A1 | * | 3/2005 | Aisu et al. | 705/37 |
| 2009/0200988 A1 | * | 8/2009 | Bridges et al. | 320/137 |
| 2011/0193522 A1 | * | 8/2011 | Uesugi | 320/109 |
| 2012/0173292 A1 | * | 7/2012 | Solomon et al. | 705/5 |
| 2012/0233077 A1 | * | 9/2012 | Tate et al. | 705/65 |
| 2012/0253531 A1 | * | 10/2012 | Tyagi et al. | 700/291 |
| 2012/0253567 A1 | * | 10/2012 | Levy et al. | 701/22 |
| 2012/0256830 A1 | * | 10/2012 | Oda et al. | 345/157 |
| 2012/0296678 A1 | * | 11/2012 | Boot et al. | 705/5 |
| 2012/0296794 A1 | * | 11/2012 | Boot et al. | 705/37 |
| 2013/0127416 A1 | * | 5/2013 | Karner et al. | 320/109 |
| 2013/0127417 A1 | * | 5/2013 | Karner et al. | 320/109 |
| 2013/0151293 A1 | * | 6/2013 | Karner et al. | 705/5 |
| 2014/0200724 A1 | * | 7/2014 | Sortomme | 700/291 |

FOREIGN PATENT DOCUMENTS

| | | |
|---|---|---|
| JP | 2008-236904 | 10/2008 |
| JP | 2009-130985 | 6/2009 |
| JP | 2011-61970 | 3/2011 |

* cited by examiner

*Primary Examiner* — Darrin Dunn
(74) *Attorney, Agent, or Firm* — Oblon, McClelland, Maier & Neustadt, L.L.P.

(57) ABSTRACT

A power demand and supply scheduling apparatus a includes a transceiver that mutually exchanges power supply reservation information including at least information of a total suppliable power amount, a suppliable state start time, a suppliable state end time, and a maximum suppliable amount per unit time zone, and power request reservation information including at least information of a total request power amount, a receivable state start time, a receivable state end time, and a maximum receivable amount per unit time zone, with scheduling apparatuses for other energy management systems each of which manage other power equipment, and a plan creating unit that plans a power reception amount and a power supply amount in each of the unit time zone which are delivered to and received from the other power equipment, and creates a power delivery and reception plan.

4 Claims, 11 Drawing Sheets

POWER SUPPLY RESERVATION 1
TOTAL SUPPLIABLE POWER AMOUNT:350kWh
TOTAL SUPPLIABLE POWER AMOUNT MINIMUM-MAXIMUM:0-400kWh
MAXIMUM SUPPLIABLE AMOUNT PER UNIT TIME ZONE:50kW
SUPPLYABLE STATE START TIME:0 O'CLOCK, OCTOBER 1
SUPPLYABLE STATE END TIME:12 O'CLOCK, OCTOBER 1

POWER SUPPLY RESERVATION 2
TOTAL SUPPLIABLE POWER AMOUNT(MAXIMUM):200kWh
TOTAL SUPPLIABLE POWER AMOUNT MINIMUM-MAXIMUM:0-200kWh
MAXIMUM SUPPLIABLE AMOUNT PER UNIT TIME ZONE:50kW
SUPPLYABLE STATE START TIME:12 O'CLOCK, OCTOBER 1
SUPPLYABLE STATE END TIME:0 O'CLOCK, OCTOBER 2

(a) EXAMPLE OF POWER RESERVATION TO
    CHARGING STATION EMS23 FROM BEMS 22

POWER SUPPLY RESERVATION 1
TOTAL SUPPLIABLE POWER AMOUNT(MAXIMUM):100kWh
TOTAL SUPPLIABLE POWER AMOUNT MINIMUM-MAXIMUM:0-200kWh
MAXIMUM SUPPLIABLE AMOUNT PER UNIT TIME ZONE:50kW
SUPPLYABLE STATE START TIME:11 O'CLOCK, OCTOBER 1
SUPPLYABLE STATE END TIME:18 O'CLOCK, OCTOBER 1

POWER SUPPLY RESERVATION 2
TOTAL SUPPLIABLE POWER AMOUNT(MAXIMUM):100kWh
TOTAL SUPPLIABLE POWER AMOUNT MINIMUM-MAXIMUM:0-150kWh
MAXIMUM SUPPLIABLE AMOUNT PER UNIT TIME ZONE:50kW
SUPPLYABLE STATE START TIME:20 O'CLOCK, OCTOBER 1
SUPPLYABLE STATE END TIME:24 O'CLOCK, OCTOBER 1

(b) EXAMPLE OF POWER RESERVATION TO
    CHARGING STATION EMS23 FROM BEMS27

POWER REQUEST RESERVATION
TOTAL REQUEST POWER AMOUNT:100kWh
TOTAL REQUEST POWER AMOUNT MINIMUM-MAXIMUM:90-100kWh
MAXIMUM RECEIVABLE AMOUNT PER UNIT TIME ZONE:50kW
RECEIVABLE STATE START TIME:10 O'CLOCK, OCTOBER 1
RECEIVABLE STATE END TIME:23 O'CLOCK, OCTOBER 1

(c) EXAMPLE OF POWER RESERVATION TO
    CHARGING STATION EMS23 FROM EV1

POWER REQUEST RESERVATION
TOTAL REQUEST POWER AMOUNT:100kWh
TOTAL REQUEST POWER AMOUNT MINIMUM-MAXIMUM:90-100kWh
MAXIMUM RECEIVABLE AMOUNT PER UNIT TIME ZONE:50kW
RECEIVABLE STATE START TIME:16 O'CLOCK, OCTOBER 1
RECEIVABLE STATE END TIME:24 O'CLOCK, OCTOBER 1

(d) EXAMPLE OF POWER RESERVATION TO
    CHARGING STATION EMS23 FROM EV2

POWER REQUEST RESERVATION
TOTAL REQUEST POWER AMOUNT:100kWh
TOTAL REQUEST POWER AMOUNT MINIMUM-MAXIMUM:70-100kWh
MAXIMUM RECEIVABLE AMOUNT PER UNIT TIME ZONE:20kW
RECEIVABLE STATE START TIME:3 O'CLOCK, OCTOBER 1
RECEIVABLE STATE END TIME:24 O'CLOCK, OCTOBER 1

(e) EXAMPLE OF POWER RESERVATION TO
    CHARGING STATION EMS23 FROM EV3

FIG.3

POWER REQUEST RESERVATION 1
TOTAL REQUEST POWER AMOUNT: 10kWh
MAXIMUM RECEIVABLE OUTPUT PER UNIT TIME ZONE: 50kW
RECEIVABLE STATE START TIME: 0 O'CLOCK OCTOBER 1
RECEIVABLE STATE END TIME: 1 O'CLOCK OCTOBER 1

POWER REQUEST RESERVATION 2
TOTAL REQUEST POWER AMOUNT: 20kWh
MAXIMUM RECEIVABLE OUTPUT PER UNIT TIME ZONE: 50kW
RECEIVABLE STATE START TIME: 1 O'CLOCK OCTOBER 1
RECEIVABLE STATE END TIME: 2 O'CLOCK OCTOBER 1

⋮

POWER REQUEST RESERVATION 7
TOTAL REQUEST POWER AMOUNT: 40kWh
MAXIMUM RECEIVABLE OUTPUT PER UNIT TIME ZONE: 50kW
RECEIVABLE STATE START TIME: 6 O'CLOCK OCTOBER 1
RECEIVABLE STATE END TIME: 7 O'CLOCK OCTOBER 1

⋮

POWER REQUEST RESERVATION 17
TOTAL REQUEST POWER AMOUNT: 30kWh
MAXIMUM RECEIVABLE OUTPUT PER UNIT TIME ZONE: 50kW
RECEIVABLE STATE START TIME: 16 O'CLOCK OCTOBER 1
RECEIVABLE STATE END TIME: 17 O'CLOCK OCTOBER 1

| TIME | STORAGE POWER AMOUNT | POWER RECEPTION AMOUNT FROM BEMS22 | POWER RECEPTION AMOUNT FROM BEMS27 | POWER LOAD OF ITSELF | POWER SUPPLY AMOUNT TO EV1 CHARGER | POWER SUPPLY AMOUNT TO EV2 CHARGER | POWER SUPPLY AMOUNT TO EV3 CHARGER |
|---|---|---|---|---|---|---|---|
| 0 | 40 | 50 | 0 | -10 | 0 | 0 | 0 |
| 1 | 50 | 30 | 0 | -20 | 0 | 0 | 0 |
| 2 | 50 | 20 | 0 | -20 | 0 | 0 | 0 |
| 3 | 50 | 45 | 0 | -25 | 0 | 0 | -20 |
| 4 | 50 | 50 | 0 | -30 | 0 | 0 | -20 |
| 5 | 45 | 50 | 0 | -35 | 0 | 0 | -20 |
| 6 | 50 | 45 | 0 | -40 | 0 | 0 | 0 |
| 7 | 50 | 30 | 0 | -30 | 0 | 0 | 0 |
| 8 | 50 | 20 | 0 | -20 | 0 | 0 | 0 |
| 9 | 30 | 10 | 0 | -30 | 0 | 0 | 0 |
| 10 | 0 | 0 | 0 | -30 | 0 | 0 | 0 |
| 11 | 0 | 0 | 50 | -30 | -20 | 0 | -20 |
| 12 | 20 | 50 | 50 | -10 | -50 | 0 | -20 |
| 13 | 10 | 50 | 0 | -10 | -30 | 0 | 0 |
| 14 | 50 | 50 | 0 | -10 | 0 | 0 | 0 |
| 15 | 50 | 20 | 0 | -20 | 0 | 0 | 0 |
| 16 | 0 | 30 | 0 | -30 | 0 | -50 | 0 |
| 17 | 0 | 0 | 0 | 0 | 0 | 0 | 0 |
| 18 | 0 | 0 | 0 | 0 | 0 | 0 | 0 |
| 19 | 0 | 0 | 50 | 0 | 0 | 0 | 0 |
| 20 | 0 | 0 | 50 | 0 | 0 | -50 | 0 |
| 21 | 50 | 0 | 0 | 0 | 0 | 0 | 0 |
| 22 | 50 | 0 | 0 | 0 | 0 | 0 | 0 |
| 23 | 50 | 0 | 0 | 0 | 0 | 0 | 0 |
| 24 | 50 | 0 | 0 | 0 | 0 | 0 | 0 |

POWER DEMAND AND SUPPLY SCHEDULING APPARATUS

CROSS REFERENCE TO RELATED APPLICATIONS

This application is based upon and claims the benefit of priority from the prior Japanese Patent Application No. 2011-209721, filed on Sep. 26, 2011, the entire contents of which are incorporated herein by reference.

FIELD

A present embodiment relates to a power demand and supply scheduling apparatus for an energy management system which, when a plurality of power equipment are interconnected, plans power supply amounts to other power equipment, and power reception amounts from the other power equipment.

BACKGROUND

It is predicted that in the future, large-capacity loads and distributed power supplies are going to increase, a room capable of being controlled by a power supply company side (power system side) is going to be small, and the power system will overall become very unstable wherein the large-capacity loads includes, for example, an electric automobile, the occurrence of the demand thereof being difficult to predict and the distributed power supplies includes, for example, a photovoltaic power generator, the occurrence of the demand being also difficult to predict. In order to control the unstable power demand and supply thereof, various EMSs (energy management systems) such as a CEMS (Community Energy Management system), a BEMS (Building Energy Management System), a HEMS (Home Energy Management System), and a FEMS (Factory Energy Management System) are proposed.

They have a main object to achieve leveling of a demand and supply and energy saving in an independent small-scale power system under management by carrying out the output increase and decrease control of distributed power supplies, suppression of a demand of power equipment, and suppression of abrupt variation and peak shift in the case of possessing energy storage equipment (a stationary storage battery, a heat storage tank and the like). For example, JP-A-2008-236904 (Kokai) proposes the example of the BEMS that performs energy management of a building, and JP-A-2009-130985 proposes the example of the HEMS that performs energy management in a household.

Further, as the system that aids interchange of power among a plurality of independent small-scale power systems, JP-A-2011-61970 (Kokai) and the like are proposed. JP-A-2011-61970 (Kokai) proposes a system which reserves power interchange amounts among respective systems in each time in advance, temporarily converts an AC power into a DC power in an interconnection line of each of the systems and interchanges power with each other.

In a conventional power system, the highest priority is placed on the necessity of complying with a supply-demand balancing rule at each unit time zone, and therefore, as for power, the system side (power supply company side) has generally set up a plan which is entirely systematic, and conducted control. When EMSs are interconnected with each other from an upper layer to a lower layer, for example, in the CEMS (Community Energy Management System) that controls a system side, and the BEMS, HEMS, FEMS and the like that control a user side such as each building and households, the operation of each EMS is independent, and the influence of the power demand/supply which occurs in the range managed by the BEMS, HEMS, FEMS and the like of the lower order is only unilaterally estimated and controlled in accordance with the demand prediction by the CEMS of the upper order. The method for creating the plan of the power amount (electric energy) interchanged at each time (hereinafter, called a power delivery and reception plan) by utilizing the power storage equipment of a partner by cooperating with each other among EMSs is not considered. For example, the above described JP-A-2011-61970 proposes the system which reserves/agrees the power interchange amount among the systems at each time in advance among a plurality of independent small-scale power systems and interchanges power with each other, but the mechanism is such that the power delivery and reception plan is on the preconditions that the system side which issues a reservation creates the entire plan, and after creation, agreement of the partner side is obtained.

When close interconnection accompanied by power delivery and reception from each other is to be carried out among the EMSs which are independent from each other, it is predicted that if the EMSs set up the plans of power delivery and reception independently from each other, interconnection with integrity of the plans being kept is difficult because the plans differ from each other in temporal grading, and the mechanism which solves this is required.

When it is assumed that the distributed power systems which the EMSs each manages includes power storage equipment with a large capacity as a buffer, regulation in a time direction of the over-and-under amount of the power amount per unit time becomes easy, and therefore, the temporal gradings of the power delivery and reception plans which are required among the EMSs which are independent from each other are likely to differ significantly. For example, it is assumed that in a building A which includes power storage equipment with a large capacity, as long as the balance of the electric power which is interchanged from outside is kept in the unit of an hour, the electric power is within the range capable of being regulated with charge and discharge of the stored power amount, and there arises no problem, whereas in a building B which does not include power storage equipment, the total amount of the balance of the electric power which is interchanged from an outside has to be kept at each instant. When electric power is interchanged between the buildings A and B as above, if a reservation of a request or a supply of electric power is made by the building A side, the B side needs to set up a power delivery and reception plan for each unit time zone which is executable based on the request of the building A side. As this example, it is predictable that when close interconnection is to be carried out among the EMSs which are independent from each other when the supply-demand balancing rule at each unit time does not have to be kept, interconnection becomes difficult because the temporal gradings of the mutual plans differ from each other.

Furthermore, it is difficult to consider that the EMSs are introduced simultaneously from the upper layer to the lower layer, and it is predictable that, for example, after the BEM (Building and Energy Management System) which controls the power demand and supply of each building is put into widespread use, the CEMS which conducts centralized control over the BEMS is introduced. Further, it is predictable that some of the EMSs of the hierarchy go down due to an accident or a failure. Therefore, the mechanism of power delivery and reception scheduling for autonomous and distributed EMSs, which operates without a problem even if the EMSs are introduced stepwise from the EMSs of the lower layer, and are capable of interconnecting with each other afterwards.

BRIEF DESCRIPTION OF THE DRAWINGS

FIG. 3 is a diagram showing examples of power supply reservation information and power request reservation information;

DETAILED DESCRIPTION

According to an embodiment, there is provided a power demand and supply scheduling apparatus for an energy management system managing power equipment, which plans power supply amounts to other power equipment and power reception amounts from the other power equipment, including a transceiver and a plan creating unit.

The transceiver exchanges information (A) and (B) with scheduling apparatuses provided for other energy management systems each of which manages corresponding other power equipment.

The information (A) is power supply reservation information including at least a total suppliable power amount, a suppliable state start time, a suppliable state end time, and a maximum suppliable amount per unit time zone, out of the total suppliable power amount, the suppliable state start time, the suppliable state end time, the maximum suppliable amount per unit time zone, and upper and lower limit values of the total suppliable power amount.

The information (B) is power request reservation information including at least a total request power amount, a receivable state start time, a receivable state end time, and a maximum receivable amount per unit time zone, out of the total request power amount, the receivable state start time, the receivable state end time, the maximum receivable amount per unit time zone, and upper and lower limit values of the total request power amount.

The plan creating unit accepts reservations of power supply and power request from the other energy management systems according to the power supply reservation information and the power request reservation information, and plans power reception amounts and power supply amounts in each of the unit time zone which are delivered to and received from the other power equipment managed by the other power management systems to create a power delivery and reception plan.

The plan creating unit uses at least any one of the reservation information, a capacity of a storage battery if the storage battery managed by the energy management system is present, and occurrence prediction of each of power generation amount and a power load by power equipment if the power equipment managed by the energy management system is present to plan so that excess or deficiency is suppressed between a power amount supplied based on the reservations and a power amount received based on the reservations in each unit time zone through an entire time period of the reservations.

Hereinafter, an embodiment will be described in detail with reference to the drawings.

Figure 1:
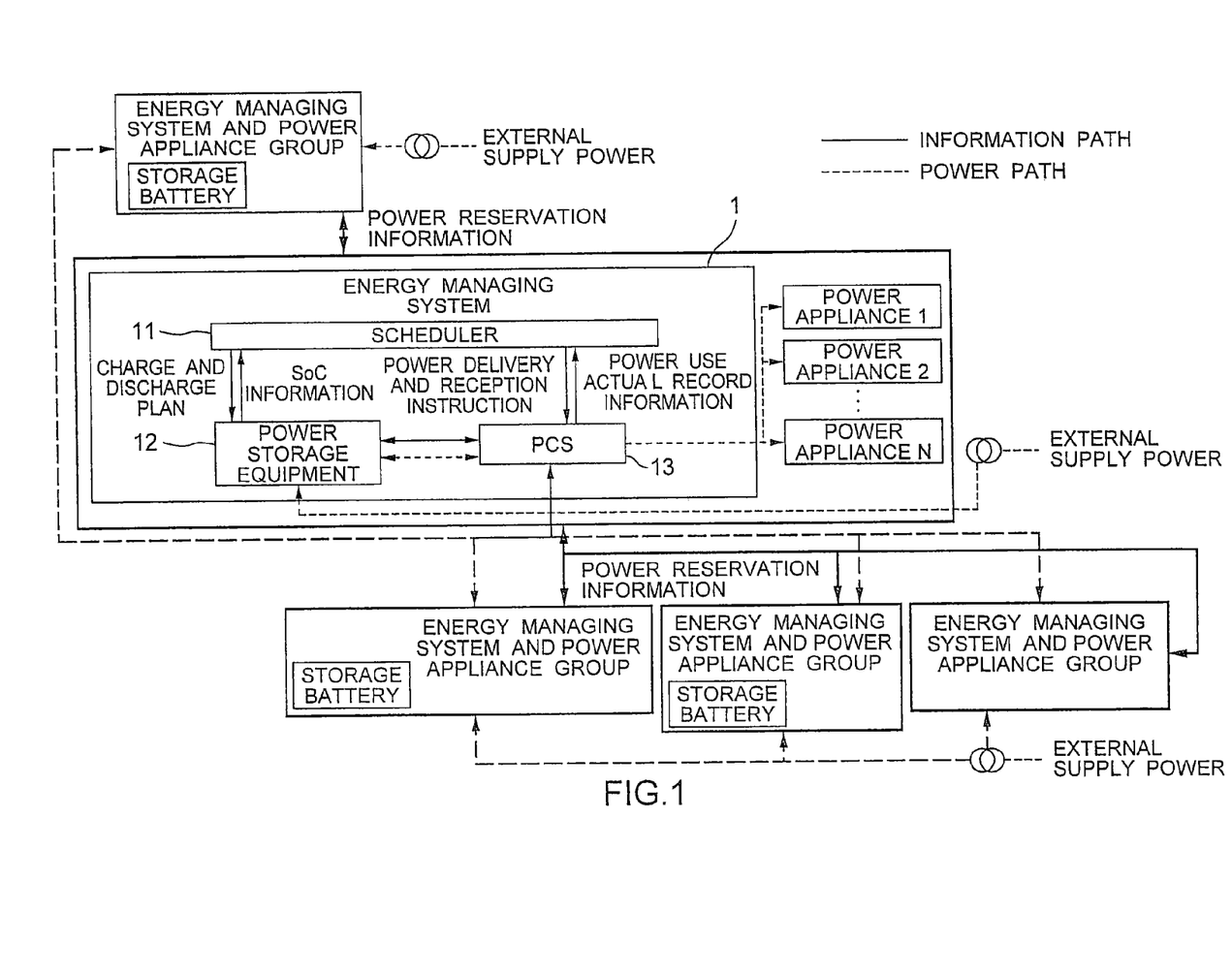
FIG. 1 is a diagram showing one configuration of an EMS to which a scheduling apparatus of a present embodiment belongs.

FIG. 1 is a diagram showing one configuration of an EMS (energy management system) to which a scheduling apparatus according to the present embodiment belongs.

The entire system includes one or more independent EMSs. In FIG. 1, reference numeral 1 designates one EMS. The EMS 1 includes a scheduler 11 which plans a power reception amount, a power supply amount, and a charge and discharge amount of a storage battery in each unit time zone, power storage equipment 12, and a PCS (Power Control System) 13 having a function of performing frequency conversion of AC power and AC/DC conversion by an inverter.

The EMS 1 manages a plurality of electric power appliances (power equipment) 1 to N as an electric power appliance group. Other EMSs 2-5 also each manage a plurality of electric power appliances as an electric power appliance group. Here, the electric power appliance group can include not only appliances which consume electric power such as an air-conditioner, a lighting appliance, an office power supply, and a charging appliance for an electric vehicle, but also devices which generate electric power such as a photovoltaic power generating apparatus and a fuel cell. Further, the configuration of the inside of the EMS is not limited to the present example, and can include no storage equipment.

In the example of FIG. 1, five independent EMSs and a plurality of electric power appliance groups which are subjected to power management by the respective EMSs are present, and carry out exchange of power request reservation information, power supply reservation information and electric power itself with each other via the EMS 1. The respective EMSs are assumed to be connected respectively by an electric power path for transferring electric power and an information path for performing mutual communication for exchanging reservation information.

The information path is not limited to directly connecting the respective EMSs Pear-to-Pear as in the present example, but the EMSs may be logically connected by using a general-purpose communication protocol of TCP/IP communication via a LAN and a WAN which are configured by giving a unique communication address to each EMS.

The electric power path is not limited to either AC or DC, if only the electric power path can transfer electric power.

Here, the power supply reservation information includes at least information of a total suppliable power amount, a suppliable state start time, a suppliable state end time, and a maximum suppliable amount per unit time zone. The electric power request reservation information includes at least information of a total requested power amount, a receivable state start time, a receivable state end time, and a maximum receivable amount per unit time zone.

Figure 8:
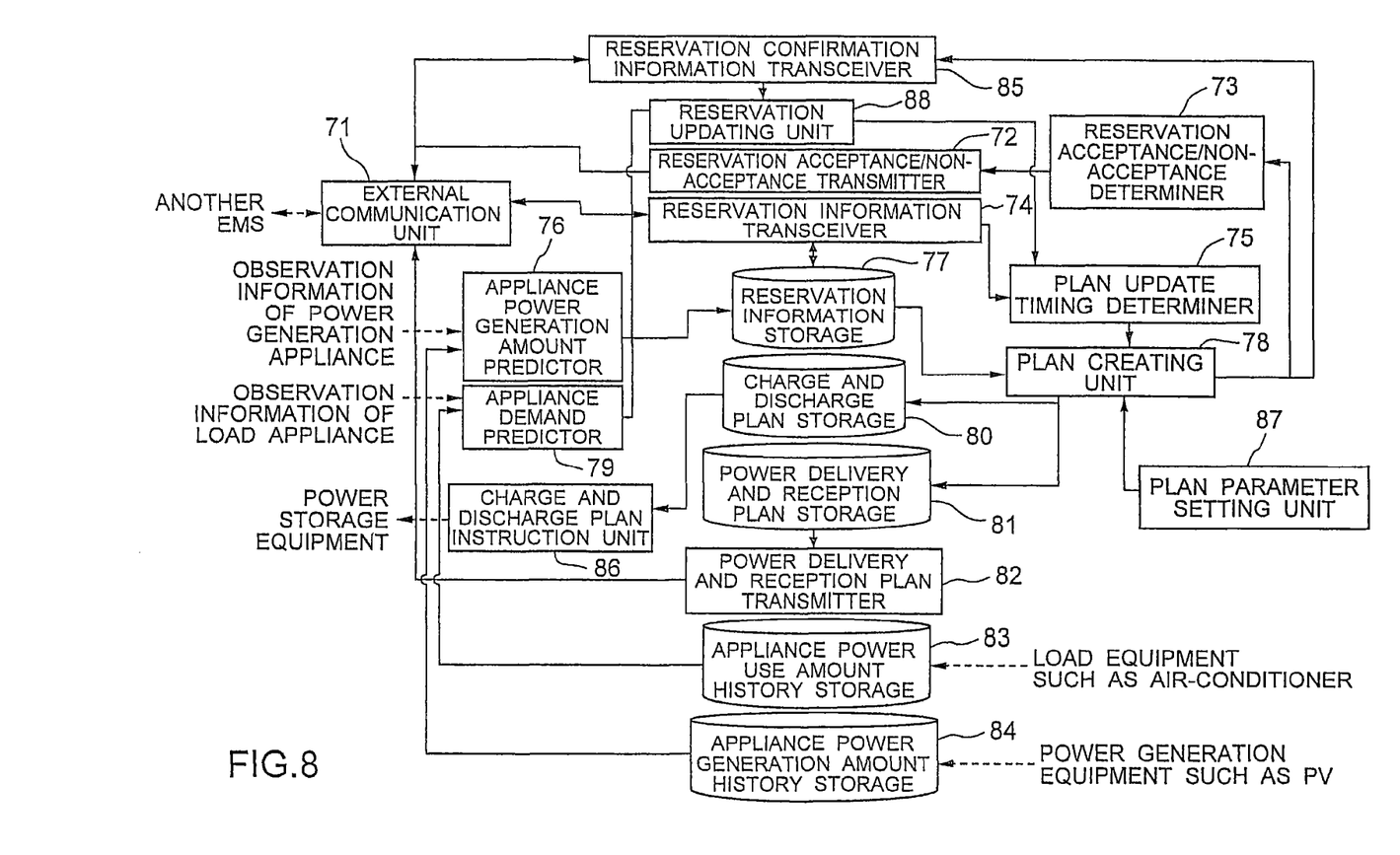
FIG. 8 is a diagram showing one embodiment of a functional configuration of an inside of the scheduler.

FIG. 8 shows one embodiment of a functional configuration of an inside of the scheduler 11 in FIG. 1.

The scheduler 11 includes, as a basic configuration thereof, an external communication unit 71, a reservation information transceiver 74, a reservation information storage 77, a plan update timing determiner 75, a plan creating unit 78, a power delivery and reception plan storage 81, a power delivery and reception plan transmitter 82, a charge and discharge plan storage 80, a charge and discharge plan instruction unit 86, a plan parameter setting unit 87, a reservation acceptance/non-acceptance determiner 73 and a reservation acceptance/non-acceptance transmitter 72.

The external communication unit 71 communicates with external modules (other EMSs).

The reservation information transceiver 74 receives power reservation information (power supply reservation information and power request reservation information) from another EMS and transmits power reservation information to the other EMS.

The reservation information storage 77 stores the power reservation information.

The plan update timing determiner 75 determines whether or not to carry out plan update processing and generates a trigger of plan updating, in timing in which a reservation (new reservation, reservation change, cancel of a reservation) is accepted, or with fixed cycles, or the like.

The plan creating unit 78 creates a power delivery and reception plan among the other EMSs and a charge and discharge plan of the power storage equipment which is managed by itself based on the reservation information in accordance with the aforesaid plan updating trigger.

The power delivery and reception plan storage 81 stores the created power delivery and reception plan.

The power delivery and reception plan transmitter 82 transmits the power delivery and reception plan to each of the EMSs of the origin of reservations.

The charge and discharge plan storage 80 stores the created charge and discharge plan.

The charge and discharge plan instruction unit 86 instructs the charge and discharge plan to the power storage equipment under management.

The plan parameter setting unit 87 sets a plan parameter of the plan creating unit 78.

The reservation acceptance/non-acceptance determiner 73 determines whether or not each reservation is acceptable based on the plan result of the plan creating unit 78.

When a reservation is non-acceptable, the reservation acceptance/non-acceptance transmitter 72 transmits the notice to that effect to each EMS which is the origin of transmission of the reservation. When the reservation is acceptable, the reservation acceptance/non-acceptance transmitter 72 may notify the EMS of the origin of the transmission of the fact that the reservation is acceptable.

In addition to these elements, the scheduler 11 can further include an appliance power use amount history storage 83, an appliance demand predictor 79, an appliance power generation amount history storage 84, an appliance power generation amount predictor 76, a reservation confirmation information transceiver 85, and a reservation updating unit 88.

When the electric power load by electric power equipment such as an air-conditioner, and lighting, that is managed by the EMS 1 itself to which the scheduler 11 belongs is occurred, the appliance power use amount history storage 83 stores actual record data of the past power use amount of the power equipment and appliances. The appliance demand predictor 79 predicts the appliance demand in the planning time period based on the actual record data of the electric power use amount and the observation value (observation information of the load appliance) which is the result of observing the present state by a sensor, and converts the predicted appliance demand into a format of the electric power request reservation. The method for predicting the appliance demand from the actual record data and the observation value is not the essence of the present embodiment, and any method may be used.

When electric power supply by private power generation equipment such as a PV or a gas turbine that is managed by the EMS 1 itself to which the scheduler 11 belongs is occurred, the appliance power generation amount history storage 84 stores the actual record data of the power generation amount of the past of the electric power equipment and appliances. The appliance power generation amount predictor 76 predicts generation power supply in the planning time period based on the actual record data of the power generation amount and the observation value (observation information of the power generation appliances) which is the result of observing the present state by a sensor, and converts the predicted generation power supply in the format of the electric power supply reservation. The method for predicting the generation power supply from the actual record data and the observation value is not the essence of the present embodiment, and any method may be used.

When upper and lower limit value information of the total suppliable power amount is included in electric power supply reservation, and the total supply power amount can be changed, or when upper and lower limit value information of a total requested power amount is included in the electric power request reservation, and the total requested electric power amount can be changed, the reservation confirmation information transceiver 85 inquires of each EMS of the origin of transmission of each reservation about confirmation of change of the total supply power amount or the total requested power amount. When the request updating unit 88 is notified of the change of the upper and lower limit values of the total supply electric power amount or the total requested electric power amount from each EMS of the origin of transmission as a result of the confirmation, the request updating unit 88 changes the reservation, thereafter, changes the reservation content of the reservation information storage 77, and further notifies the plan update timing determiner 75 of the plan update.

Figure 2:
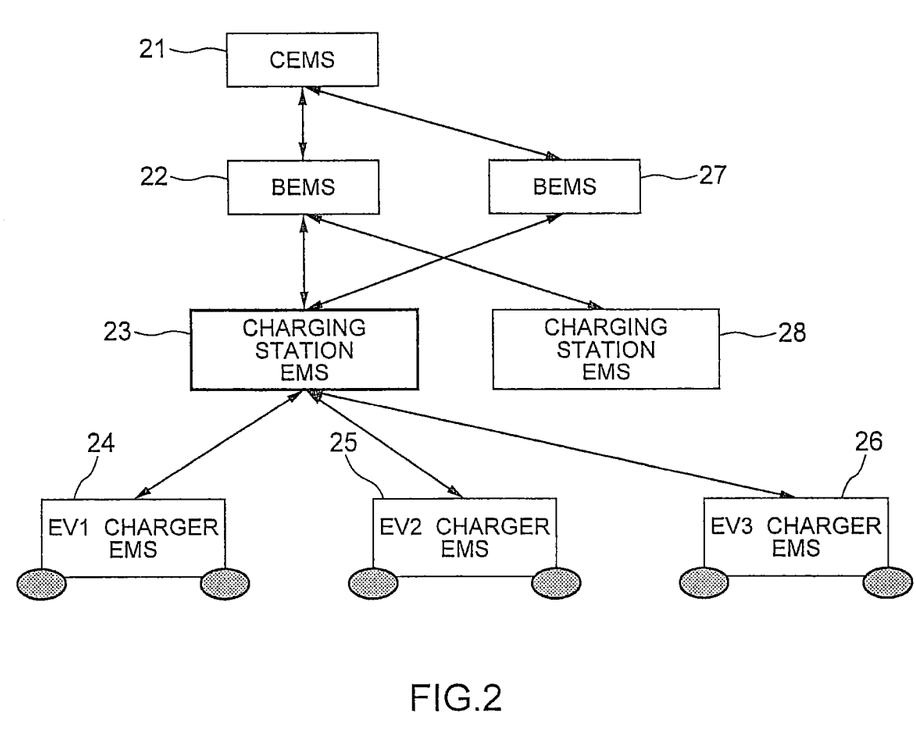
FIG. 2 is a diagram showing an example of a plurality of EMSs which form a hierarchical configuration.

With use of FIGS. 2 to 5, one example of exchange of the power supply reservation information and the power request reservation information for performing mutual interconnection among a plurality of EMSs which form a hierarchical configuration. In the example of FIG. 2, a charging station for an electric vehicle installed in a large parking lot which is shared by a plurality of buildings is assumed to be managed as independent equipment, and an EMS 23 for managing a charging station 1, which manages a charger group (a plurality of chargers) for electric vehicles is set as a target.

In FIG. 2, the arrows show being connected to each other by the information lines and the electric power lines in FIG. 1. The example of FIG. 2 shows that electric power is supplied to a BEMS 22 and a BEMS 27 from an electric power system managed by a CEMS 21, and the charging station EMS 23 can be supplied with electric power from both the BEMS 22 and the BEMS 27. Further, a charger of an electric vehicle EV 1, a charger of an EV 2, and a charger of an EV 3 are each assumed to include a single EMS for performing charging control of an electric vehicle, and to receive power supply from the charging station EMS 23. The EMS for performing charging control of each of the electric vehicles may be loaded on a charger controller side such as a rapid charger, or may be loaded on the electric vehicle side.

It is assumed that the scheduling apparatus belonging to the BEMS 22 only sets up a rough estimation plan to supply extra electric power to the charging station in consideration of electric power necessary for electric equipment such as an air-conditioner and lighting managed by itself and the present storage power amount with respect to the use electric power of the charging station, and a lower-order scheduling apparatus which manages the charging station sets up a detailed plan.

FIG. 3 shows an example of electric power reservation information. In the present example, the EMS 23 for the charging station is assumed to receive two pieces of power supply reservation information of (a) of FIG. 3 from the BEMS 22 in advance. The present example shows the reservation information that with the unit time being set as one hour, the total power of 350 kWh can be supplied to the charging station with the maximum of 50 kW between 0 to 12 o'clock on October 1, and the total power of 200 kWh can be supplied at the maximum of 50 kW between 12 to 24 o'clock.

In addition, the EMS 23 for the charging station is also assumed to receive two pieces of power supply reservation information of (b) of FIG. 3 from the BEMS 27. The present example shows the reservation information that the total power of 100 kWh can be supplied to the charging station with the maximum of 50 kW between 11 to 18 o'clock on October 1, and also can further supply the total power of 100 kWh with the maximum of 50 kW between 20 to 24 o'clock.

The EMS 23 for the charging station can receive the power request reservation information of (c), (d) and (e) of FIG. 3 in advance from the EMSs which manage the chargers of the respective lower EVs. The (c) of the present example shows that the EV 1 desires to charge the total power of 100 kWh with the maximum of 50 kW between 10 o'clock to 23 o'clock on October 1. This corresponds to the case or the like in which the EV 1 arrives at the building before 10 o'clock on October 1, connects to the charging connector to be in a state capable of starting charging, and has to complete charging by 23 o'clock to depart therefrom.

Figure 4:
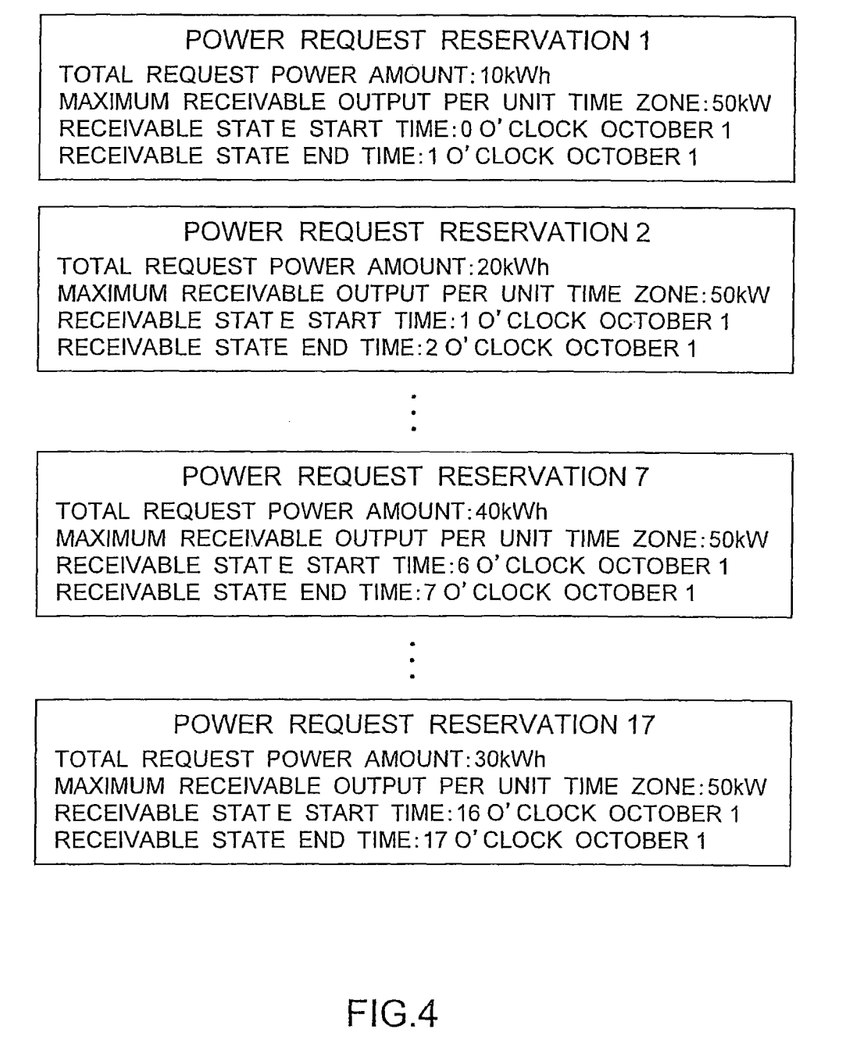
FIG. 4 is a diagram showing examples of converting power loads into power request reservation information.

When there is an electric power load by the electric equipment such as an air-conditioner and lighting of the charging station managed by the EMS 23 for the charging station itself, or when there is the power generation equipment such as photovoltaic generation equipment or gas turbine equipment, the power supply amount of the power generation equipment managed by itself and the generation amount of the power load are predicted, and they can be virtually handled as electric power reservations. FIG. 4 shows an example of conversion of the electric power load into the electric power request reservation information. In this example, the power load prediction value for 17 hours at each unit time of one hour from 0 o'clock to 17 o'clock on October 1 is dealt as the power request reservation information.

Every specified time which is determined in advance, the EMS 23 for the charging station temporarily closes reception of the power reservation information, and the scheduler updates the power delivery and reception plan, and the charge and discharge plan at the time point, and notifies each origin of the reservation having the plan changed of a new plan. As the timing of updating the power delivery and reception plan, the event-driven method can be adopted, which carries out updating in each timing when addition of a new reservation, cancel of the existing reservation, and update of the existing reservation content are performed.

The scheduler of the EMS 23 for the charging station plans the power supply amount from the power supply reservation origin EMS and the power supply amount to the power request reservation origin EMS in each unit time zone so that the over-and-under amount of the power amount supplied based on the reservation and the power amount received based on the reservation is within the specified maximum and minimum range through all the planning time period, based on the information of all of the accepted power reservations, and the capacity of a storage battery in the case of having the storage battery under management.

Figure 5A:
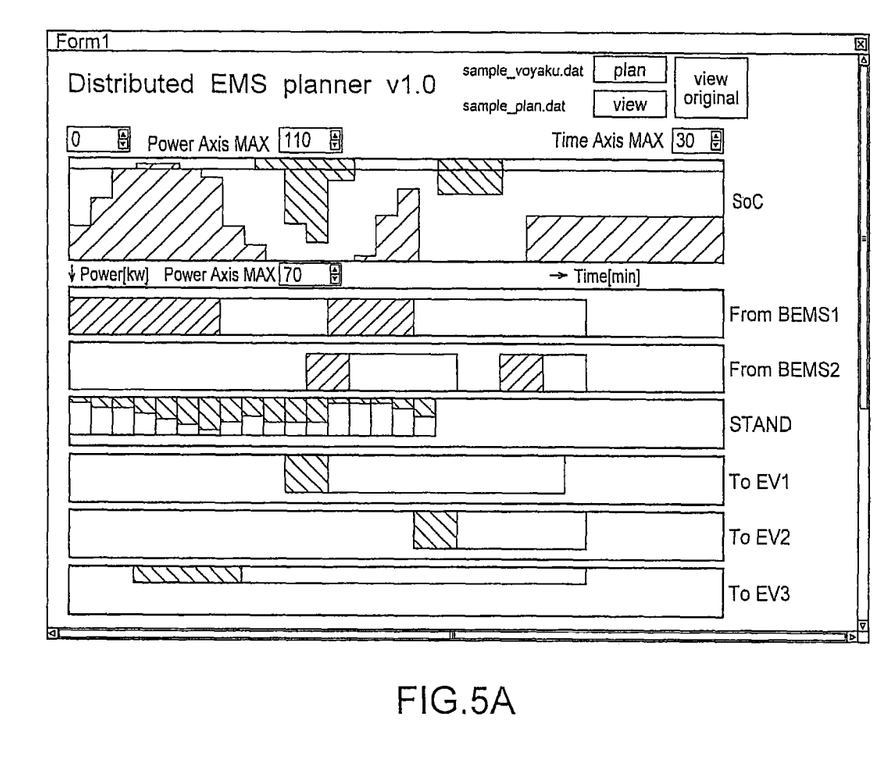
FIG. 5A is a view showing a screen graphically displaying the reservation information of FIG. 3.
Figure 5B:
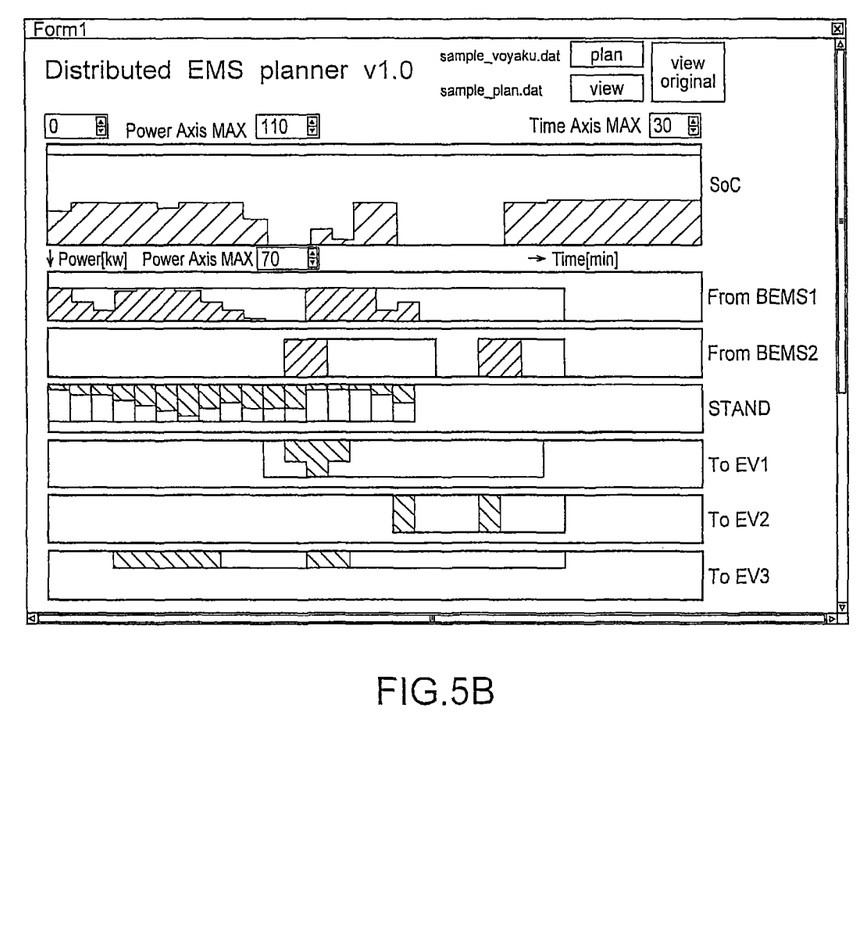
FIG. 5B is a view showing a power delivery and reception plan which is created by a scheduler of a charge station EMS based on the reservation information of FIG. 3.
Figure 5C:
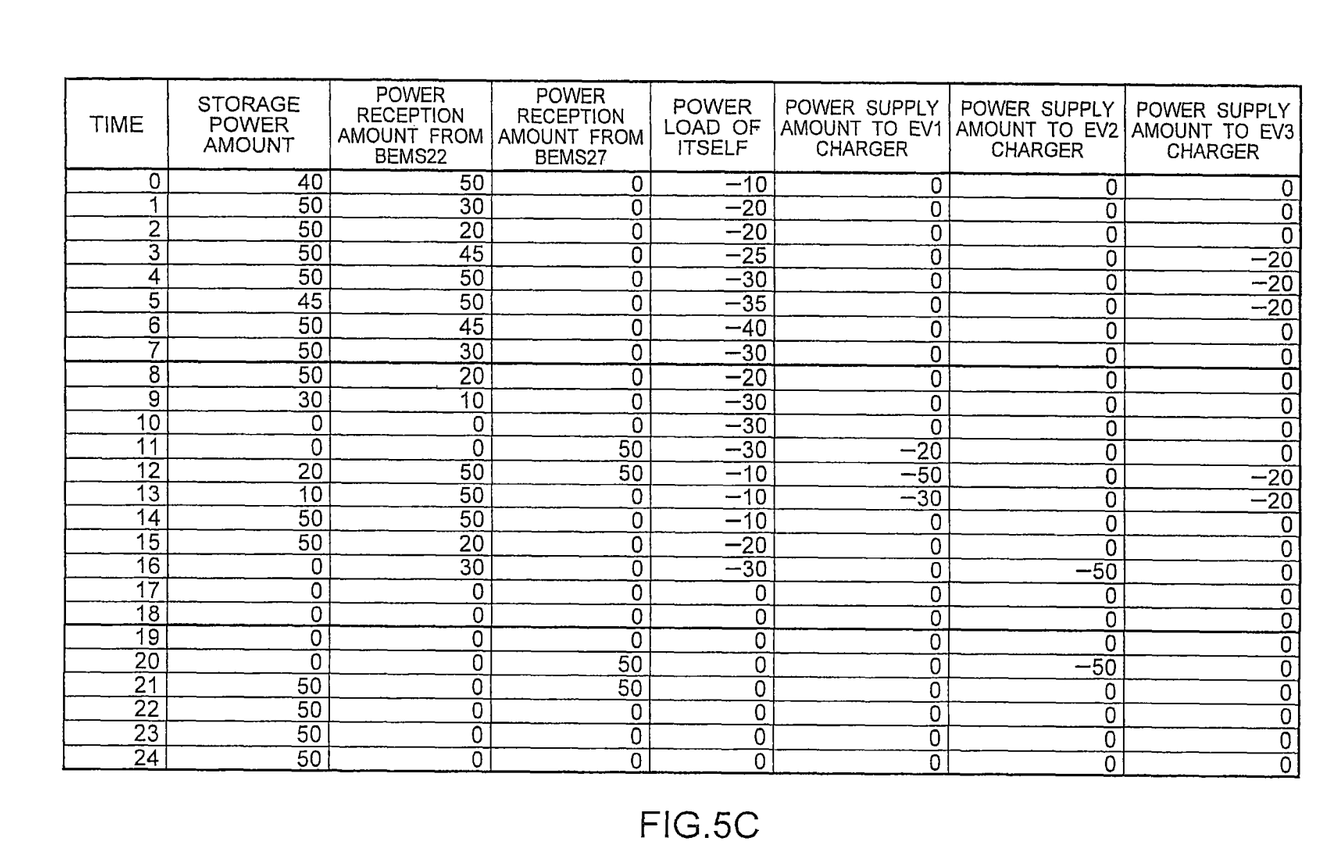
FIG. 5C is a diagram expressing a power delivery and reception plan in a tabular format.

FIG. 5A shows an example which graphically displays the reservations of FIGS. 2 and 3. FIGS. 5B and 5C show one example of the power delivery and reception plan created by the scheduler of the EMS 23 for the charging station based on the reservations of FIGS. 2 and 3. In each of the drawings, in the respective graphs of GUI, the uppermost graph corresponds to the charge amount (SoC) of the storage battery, that is, the storage battery charge and discharge plan, the second graph and the following graphs respectively show the reception powers every one hour by the EMS 23 for the charging station from the BEMS 22 and the BEMS 27, the prediction value of the supply power to the power equipment managed by itself, and the power supply plans for every one hour to the EV chargers EMS 24, 25 and 26 from the EMS 23 for the charging station.

In the second and the following power delivery and reception plan graphs, a positive direction indicates a reception (input) power of the EMS 23 for the charging station, and a negative direction indicates a provided (output) power. Further, the frame line indicates information of the power reservation information (a start time, an end time and a maximum power per unit time zone). FIG. 5A shows the case of delivering and receiving electric powers with the maximum possible output per unit time zone following reservations respectively (state before the plan), and it is understandable that if this is carried out as it is, the electric power becomes insufficient halfway. FIG. 5B shows the state after the plan, and it is understandable that the over-and-under amount of the amount of the power supplied based on the reservation and the amount of the power received based on the reservation in each unit time zone is within range of the capacity of the storage battery managed by itself. FIG. 5C shows the power delivery and reception plan and the charge and discharge plan of FIG. 5B in the tabular format. FIGS. 5B and 5C show the examples of actual scheduling creation by using the method by heuristics which will be described later.

As shown in FIGS. 5A to 5C, in the present method, even if the EMS has reservations of power supply and power request made with an optional temporal grading by another EMS, the EMS can create and carry out a specific power delivery and reception plan for each unit time zone which is manageable. The examples of FIGS. 2 to 5 are the examples in which the reservations have the temporal gradings rougher than the plan unit (1 to 13 hours), but when the reservations have the temporal gradings finer than the plan unit, the method can be adopted, which obtains the total amount of the power delivery and reception amounts per unit time zone (plan unit) for each of the partner EMSs of the transmission origin of the reservations, and converts the total amount into the reservation of each unit time zone.

Figure 6:
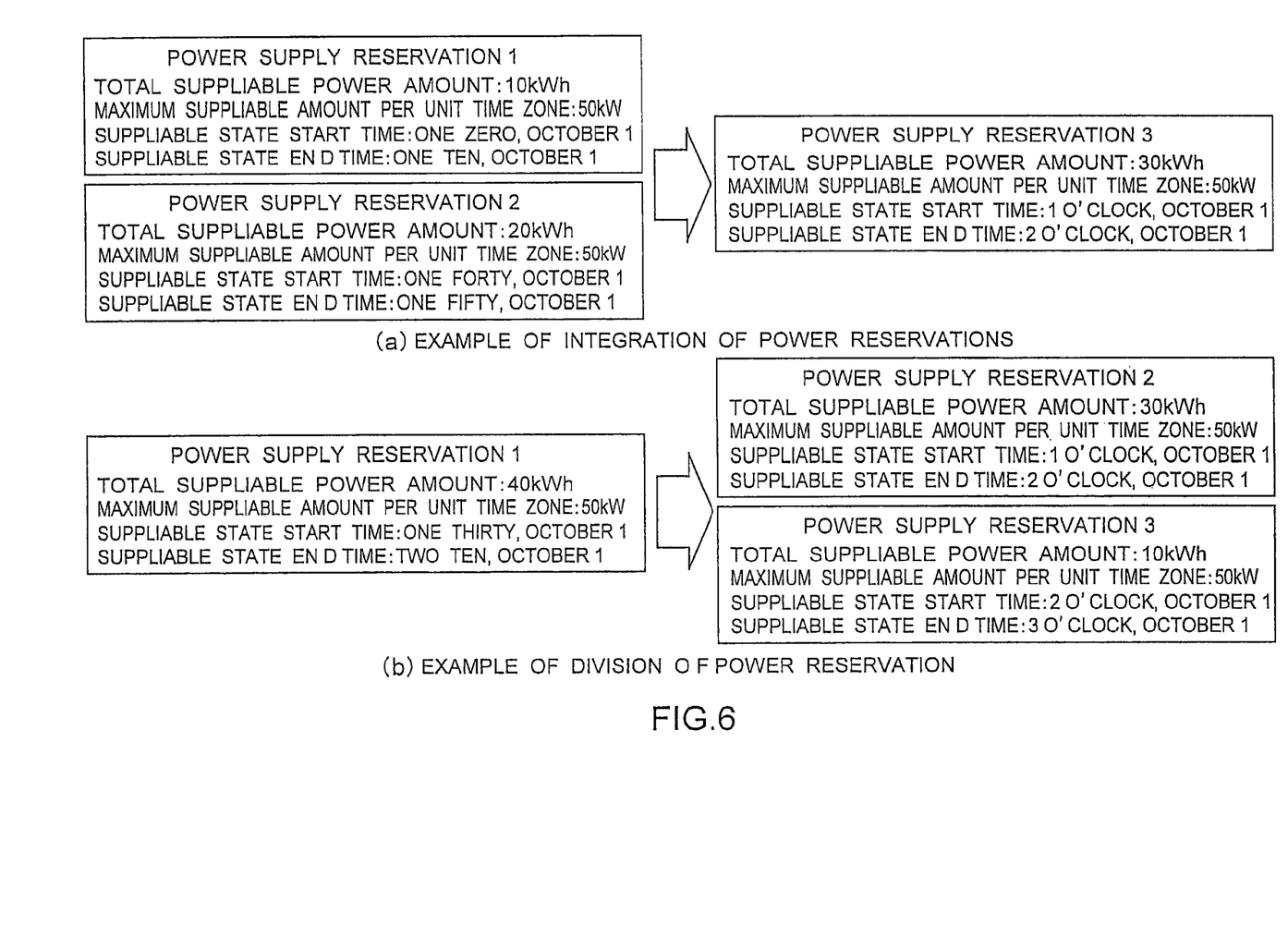
FIG. 6 is a diagram showing examples of integration of power supply reservations and division of a power supply reservation.

(a) of FIG. 6 shows an example of integrating two reservations into one reservation because the reservations have the temporal gradings finer than the plan unit. In the example of (a) of FIG. 6, power supply reservations 1 and 2 are respectively the reservations based on the plan in the unit of ten minutes, but the plan unit of the EMS 23 for the charging station is in the unit of one hour, and therefore, the power supply reservations 1 and 2 are processed by internally converted as being equivalent to a reservation 3 which is supplied with 30 kwh as the total amount between 1 o'clock and 2 o'clock.

(b) of FIG. 6 shows an example of dividing one reservation into two reservations because the boundary of the time of the reservation and the temporary grading of the plan of the side receiving the reservation do not correspond to each other. In the example of (b) of FIG. 6, a different unit time zone starts with 2 o'clock as the boundary in the EMS 23 for the charging station, and therefore, the power supply reservation 1 is processed by internally converted as being equivalent to the addition of the reservations 2 and 3 which are supplied with 30 kwh between 1 o'clock to 2 o'clock, and 10 kwh between 2 o'clock to 3 o'clock. Here, 40 kwh of the reservation 1 is divided proportionally in accordance with the length of the times which overlap the respective unit time zones, but the method may be adopted, which integrates the total power amount in the time zone which is longer of the overlapping times, and the dividing method of the power amount is not especially limited.

In the case of failure in updating the plan which satisfies the conditions of each reservation, the EMSs of the origins of transmission of the reservations which are newly accepted, or the reservations the contents of which are changed, after the success of the plan update of the previous time, are notified of the fact that the reservations are not acceptable. Alternatively, a priority degree is given to each of the EMSs, and in the case of failure in updating the plan which satisfies the conditions under the new reservation conditions, the method can be adopted, which successively repeats replanning by eliminating the reservations given by the EMSs of lower priority degrees one by one of the reservations which are newly accepted after the plan update of the previous time until succeeding in planning, and notifies the EMSs of the origins of transmission of the reservations which are excluded by the time when succeeding in the plan creation of the fact that the reservations cannot be accepted.

When the upper and lower limit value information of the total power amount is included in the power reservation, the value of the total power amount to be delivered and received to and from the EMS of the origin of transmission of the reservation can be changed within the upper and lower limits, but when the total power amount is changed, confirmation to the EMS of the origin of transmission of the reservation is needed.

Figure 9:
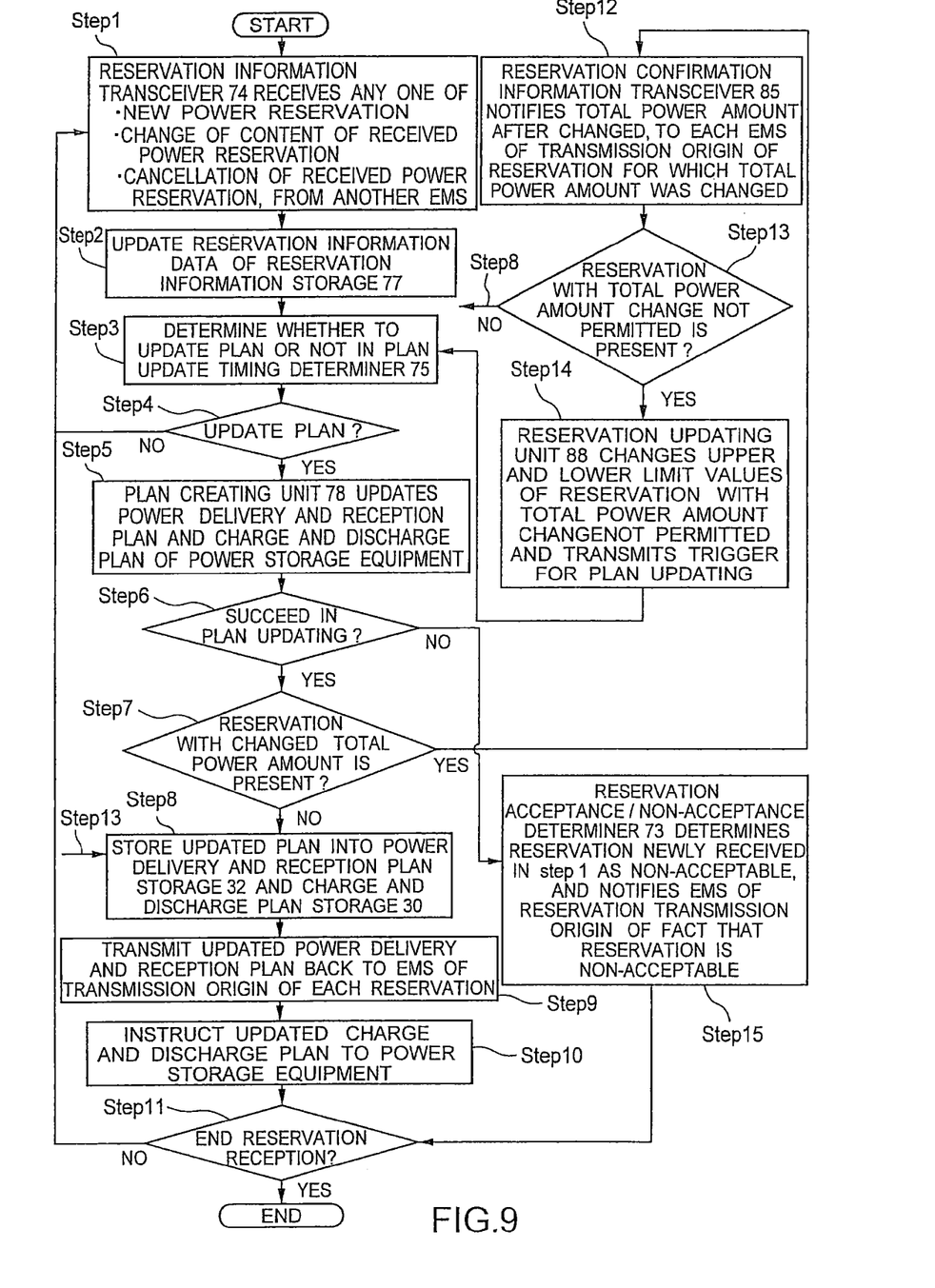
FIG. 9 is a flowchart showing a general flow of power reservation processing which is performed by the scheduler.

FIG. 9 shows a rough flow of the power reservation processing which is performed by the scheduler 11. FIG. 9 shows the example of the processing in the case of the reservation including the upper and lower limit value information of the total power amount, and in the case without the upper and lower limit value information of the total power amount, the processings of Step 7 and Step 12 to Step 14 are not required.

In FIG. 9, when the reservation information transceiver 74 receives any of a new power reservation, change of the content of a received power reservation, and cancellation of a received power reservation (Step 1), the reservation information transceiver 74 updates the reservation information data of the reservation information storage 77 (Step 2), and the plan update timing determiner 75 determines whether to update a plan or not (Step 3).

When it is determined that the plan is to be updated (YES of Step 4), the plan creating unit 78 updates the power delivery and reception plan, and the charge and discharge plan of the power storage equipment (Step 5). In the case of succeeding in plan updating (YES of Step 6), if there is no reservation in which the total power amount of the reservation is changed between the upper and lower limit values to update the plan (NO of Step 7), the updated plans each are stored in the power delivery and reception plan storage 81 and the charge and discharge plan storage 80 (Step 8), the updated power delivery and reception plan is transmitted to the EMS of the origin of transmission of each of the reservations (step 9), and the updated charge and discharge plan is instructed to the power storage equipment (Step 10). When the reserve reception is continued in succession (NO of Step 11), the flow returns to Step 1.

In the case of failing in plan updating (NO of Step 6), the reservation acceptance/non-acceptance determiner 73 determines a newly received reservation as non-acceptable, and notifies the EMS of the origin of transmission of the reservation of the fact of non-acceptance (Step 15).

If there is a reservation in which the total power amount of the reservation is changed between the upper and lower limit values to update the plan (YES of Step 7), the reservation confirmation information transceiver 85 notifies each EMS of the origin of transmission of the reservation having the total power amount changed of the total power amount after being changed (Step 12). If there is a reservation in which change of the total power amount is not permitted by the response from the EMS of the origin of transmission (YES of Step 13), the reservation updating unit 88 changes the upper and lower limit values of the reservation in which change of the total power amount is not permitted out of the reservations of the reservation information storage 77, and after changing the conditions of plan updating, transmits the trigger of plan updating again (Step 14), and the flow returns to the processing of the plan update timing determiner 75 of Step 3. When change of the total power amount is all permitted (NO of Step 13), the flow shifts to the processing of Step 8.

Here, a method of the plan in the plan creating unit 78 of the scheduler 11 based on the reservation will be described. For this, several methods are conceivable, such as a method which discretizes a time to make a kind of network flow model to be formulated and solved it as a mixed integer programming problem, and a method by heuristics. Here, as a simple method, heuristics based on a leveling method will be described as an example.

Figure 7:
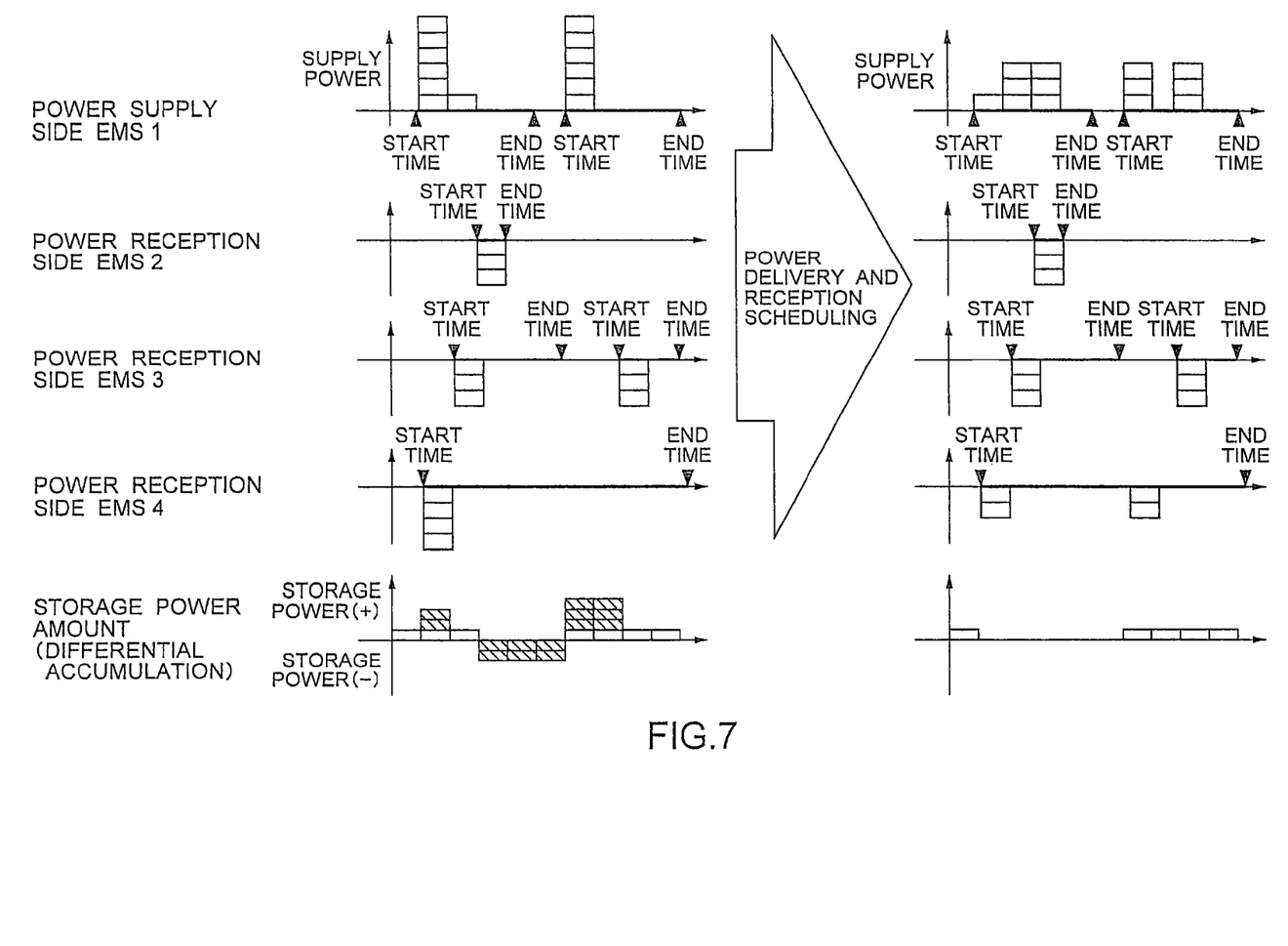
FIG. 7 is a diagram explaining a method of a plan which is performed by a plan creating unit of the scheduler.

FIG. 7 shows a conceptual diagram of the present method. In the present method, the power and the time are discretized by a constant unit amount as shown in the diagram. FIG. 7 shows that two power supply reservations comes from the EMS 1, one power request reservation comes from each of the EMSs 2 and 4, and two power request reservations come from the EMS 3. In the drawing, the left side is the initial state before scheduling, which is the state in which the maximum power amounts per unit time are delivered and received simultaneously with the start time to and from the respective power reservations. The total power amount in the initial state (the total number of boxes each showing a discretized power in FIG. 7) is set to be the total request power amounts and the total supply power amounts of the respective reservations. The lowest graph of FIG. 7 shows the power amount stored in the storage battery managed by itself (the number of boxes each showing a discretized power) in the initial state, and the initial value is set as one unit power, the upper and lower limits of the storage power capacity are set as one unit power at the maximum to zero unit power at the minimum.

The accumulated value of the difference of the power supplied from other EMSs and the power provided to other EMSs is the power amount stored in the power storage equipment managed by the EMS. In the initial state, the state is such that the received power and the supplied power are not balanced at each time, and therefore, there is the instant at which the difference of the accumulated values between the power supplied from other EMSs and the power provided to the other EMSs exceeds (i.e. become larger or lower than) the upper and lower limits of the capacity of the power storage equipment managed by itself, and the over-and-under amount of the power are not balanced, and the plan is not executable as it is. In FIG. 7, the hatched boxes represent the power amounts which exceeds (deviates from) the upper and lower limits of the storage capacity in the initial state.

In the method of the present embodiment, a time "T" which is the earliest of the times at which the power amount stored in the storage battery managed by itself (the differential accumulated value between the supplied power and the provided power) exceeds the upper and lower limits of the storage power capacity is retrieved, and when the power amount exceeds the upper limit of the storage power capacity, the power amount received from the other EMSs before the time "T" is regarded as excessive, and the power supply reservation which receives power before the time "T" and can shift the power of the unit amount to after the time "T" is found. The power of the unit amount (box showing the discretized power in FIG. 7) is shifted to the earliest time at which the power amount becomes smaller than the maximum power amount per unit time after the time "T". Conversely, when the power amount exceeds the lower limit of the storage capacity, the power which is provided to the other EMSs before the time "T" is regarded as excessive, and the power request reservation which provides power before the time "T", and can shift the power of the unit amount to after the time "T" is found. Subsequently, the power of the unit amount is shifted to the earliest time when the power amount becomes smaller than the maximum power amount per unit time after the time "T". When a plurality of reservations which can be subjected to shift processing are present, several methods are conceivable such as the method which processes the reservations in the sequence of the priority degrees, and the method which finds the reservation with the smallest time width of the power shift, and sets the reservation as an object to be shifted.

The above shift processing of the unit power (a kind of leveling processing) is repeated until the power amount stored in the storage battery does not exceeds the upper and lower limits of the storage capacity (i.e., falls with a range of the upper and lower limits), whereby the plan of power delivery and reception which is well balanced so that the power amount stored in the storage battery is within the range of the storage capacity in all the times as in the right side of the drawing can be created at a high speed.

If the reservation which can shift the power of the unit amount to after the time "T" is not present though there exists the time when the power amount exceeds the upper and lower limits of the storage capacity, increase and decrease processing of the total power amount for regulation by using the widths of the upper and lower limit values of the total power amount of each reservation is performed.

More specifically, when the power amount exceeds the upper limit of the storage capacity at the time "T", the reservation is found, which is the power supply reservation starting before the time "T", and has the power amount which does not exceeds the lower limit value of the total power amount even if the power of the unit amount is subtracted from the total power amount at the present time point, and the power of the unit amount is subtracted at the time before the time "T". Alternatively, the reservation is found, which is a power request reservation which starts before the time "T", and has the power amount which does not exceeds the upper limit value of the total power amount even if the power of the unit amount is added to the total power amount at the present time point, and the power of the unit amount is added at the time before the time "T".

In the case of exceeding the lower limit of the storage capacity at the time "T", a reservation is found, which is a power supply reservation that starts before the time "T", and has the power amount which does not exceed the lower limit value of the total power amount even if the power of the unit amount is added to the total power amount at the present time point, and the power of the unit amount is added at the time before the time "T". Alternatively, the reservation is found, which is the power request reservation starting before the time "T", and has the power amount which does not exceeds the lower limit value of the total power amount even if the power of the unit amount is subtracted from the total power amount at the present time point, and the power of the unit amount is subtracted at the time before the time "T".

The increase and decrease processing of the total power amount is repeated until the reservation in which the power of the unit amount can be shifted to after the time "T" appears, and after the reservation which can shift the power of the unit amount is found, the process returns to repetition of the shift processing.

As above, according to the present embodiment, the respective energy management systems of the power supply side and the power reception side can cooperate with each other and interchange power via a power supply reservation and a power request reservation while independently managing the respective power equipment and power storage equipment.

The scheduling apparatus may also be realized using a general-purpose computer device as basic hardware. That is, the elements of the apparatus can be realized by causing a processor mounted in the above described computer device to execute a program. In this case, the apparatus may be realized by installing the above described program in the computer device beforehand or may be realized by storing the program in a storage medium such as a CD-ROM or distributing the above described program over a network and installing this program in the computer device as appropriate. Furthermore, the storage in the apparatus may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power demand and supply scheduling apparatus for an energy management system managing power equipment, which plans power supply amounts to other power equipment and power reception amounts from the other power equipment, comprising:
    a transceiver configured to exchange information (A) and (B) with scheduling apparatuses provided for other energy management systems each of which manages corresponding other power equipment, (A) power supply reservation information including at least a total suppliable power amount, a suppliable state start time, a suppliable state end time, and a maximum suppliable amount per unit time zone, out of the total suppliable power amount, the suppliable state start time, the suppliable state end time, the maximum suppliable amount per unit time zone, and upper and lower limit values of the total suppliable power amount, and (B) power request reservation information including at least a total request power amount, a receivable state start time, a receivable state end time, and a maximum receivable amount per unit time zone, out of the total request power amount, the receivable state start time, the receivable state end time, the maximum receivable amount per unit time zone, and upper and lower limit values of the total request power amount; and a processor based plan creating unit configured to accept reservations of power supply and power request from the other energy management systems according to the power supply reservation information and the power request reservation information, and plan power reception amounts and power supply amounts in each of the unit time zone which are delivered to and received from the other power equipment managed by the other power management systems to create a power delivery and reception plan, wherein the plan creating unit uses at least any one of the reservation information, a capacity of a storage battery when the storage battery managed by the energy management system is present, and occurrence prediction of each of power generation amount and a power load by power equipment when the power equipment managed by the energy management system is present to plan so that excess or deficiency is suppressed between a power amount supplied based on the reservations and a power amount received based on the reservations in each unit time zone through an entire time period of the reservations, wherein as timing in which the plan creating unit updates the power delivery and reception plan, the plan creating unit temporarily closes reception of the reservation at each specified time, updates the power delivery and reception plan based on a reservation received earlier than a reservation closing time, and notifies a new plan to a scheduling apparatus for which a plan is changed, and when the plan creating unit cannot create a power delivery and reception plan which satisfies the power supply reservation information and the power request reservation information, the plan creating unit notifies an energy management system being a transmission origin of a reservation which is newly received and which is changed with respect to content thereof after plan updating succeeded previous time that the reservation is not acceptable.

2. A power demand and supply scheduling apparatus for an energy management system managing power equipment, which plans power supply amounts to other power equipment and power reception amounts from the other power equipment, comprising:

a transceiver configured to exchange information (A) and (B) with scheduling apparatuses provided for other energy management systems each of which manages corresponding other power equipment, (A) power supply reservation information including at least a total suppliable power amount, a suppliable state start time, a suppliable state end time, and a maximum suppliable amount per unit time zone, out of the total suppliable power amount, the suppliable state start time, the suppliable state end time, the maximum suppliable amount per unit time zone, and upper and lower limit values of the total suppliable power amount, and (B) power request reservation information including at least a total request power amount, a receivable state start time, a receivable state end time, and a maximum receivable amount per unit time zone, out of the total request power amount, the receivable state start time, the receivable state end time, the maximum receivable amount per unit time zone, and upper and lower limit values of the total request power amount; and a processor based plan creating unit configured to accept reservations of power supply and power request from the other energy management systems according to the power supply reservation information and the power request reservation information, and plan power reception amounts and power supply amounts in each of the unit time zone which are delivered to and received from the other power equipment managed by the other power management systems to create a power delivery and reception plan, wherein the plan creating unit uses at least any one of the reservation information, a capacity of a storage battery when the storage battery managed by the energy management system is present, and occurrence prediction of each of power generation amount and a power load by power equipment when the power equipment managed by the energy management system is present to plan so that excess or deficiency is suppressed between a power amount supplied based on the reservations and a power amount received based on the reservations in each unit time zone through an entire time period of the reservations, wherein as timing in which the plan creating unit updates the power delivery and reception plan, the plan creating unit temporarily closes reception of the reservation at each specified time, updates the power delivery and reception plan based on a reservation received earlier than a reservation closing time, and notifies a new plan to a scheduling apparatus for which a plan is changed, and when the plan creating unit cannot create a power delivery and reception plan which satisfies the power supply reservation information and the power request reservation information, the plan creating unit successively repeats replanning by excluding one reservation accepted from an energy management system with a lower priority degree among reservations newly accepted after plan updating of a previous time until succeeding in plan updating, and notifies the energy management system for which the reservation is excluded that the reservation is not acceptable.

3. A power demand and supply scheduling apparatus for an energy management system managing power equipment, which plans power supply amounts to other power equipment and power reception amounts from the other power equipment, comprising:

a transceiver configured to exchange information (A) and (B) with scheduling apparatuses provided for other energy management systems each of which manages corresponding other power equipment, (A) power supply reservation information including at least a total suppliable power amount, a suppliable state start time, a suppliable state end time, and a maximum suppliable amount per unit time zone, out of the total suppliable power amount, the suppliable state start time, the suppliable state end time, the maximum suppliable amount per unit time zone, and upper and lower limit values of the total suppliable power amount, and (B) power request reservation information including at least a total request power amount, a receivable state start time, a receivable state end time, and a maximum receivable amount per unit time zone, out of the total request power amount, the receivable state start time, the receivable state end time, the maximum receivable amount per unit time zone, and upper and lower limit values of the total request power amount; and a processor based plan creating unit configured to accept reservations of power supply and power request from the other energy management systems according to the power supply reservation information and the power request reservation information, and plan power reception amounts and power supply amounts in each of the unit time zone which are delivered to and received from the other power equipment managed by the other power management systems to create a power delivery and reception plan, wherein the plan creating unit uses at least any one of the reservation information, a capacity of a storage battery when the storage battery managed by the energy management system is present, and occurrence prediction of each of power generation amount and a power load by power equipment when the power equipment managed by the energy management system is present to plan so that excess or deficiency is suppressed between a power amount supplied based on the reservations and a power amount received based on the reservations in each unit time zone through an entire time period of the reservations, wherein power is discretized according to a unit amount, an initial state is set as a state in which the maximum suppliable amount per unit time zone and the maximum receivable amount per unit time zone is delivered and received with respect to each reservation simultaneously with a start time, an earliest time in which an accumulated value of a difference between received power and supplied power exceeds an upper and lower limits of a storage capacity of the storage battery is retrieved, and processing of (A) and (B) is repeated until the accumulation value falls within the range of the upper and lower limits, (A) finding a power supply reservation which receives power before the earliest time and can shift power of the unit amount to after the earliest time when the accumulated value exceeds an upper limit at the earliest time, and shifting a reception power of the unit amount to after the earliest time, and (B) finding a power request reservation which provides power before the earliest time, and can shift power of a unit amount to after the earliest time when the accumulated value exceeds the lower limit at the earliest time, and shifting provided power of the unit amount to after the earliest time.

4. The apparatus according to claim 3, wherein when a reservation capable of shifting power of a unit amount to after the earliest time is not present, processing (A) and (B) are repeated until a reservation capable of shifting the power of the unit amount to after the earliest time is found, and after the reservation is found, processing returns to repetition of shift processing recited in claim 3, (A) in a case of exceeding an upper limit of the storage capacity at the earliest time, (1) finding a power supply reservation which starts before the earliest time, and does not exceed the lower limit value of the total suppliable power amount even when power of a unit amount is subtracted from the total suppliable power amount at a present time, and subtracting the power of the unit amount at a time before the earliest time, or (2) finding a power request reservation which starts before the earliest time, and does not exceed the upper limit value of the total request power amount even when the power of the unit amount is added to the total request power amount at the present time, and adding the power of the unit amount at a time before the earliest time, and (B) in a case of exceeding a lower limit of the storage capacity at the earliest time, (1) finding a power supply reservation which starts before the earliest time, and does not exceed the upper limit value of the total suppliable power amount even if the power of the unit amount is added to the total suppliable power amount of the present time, and adding the power of the unit amount at a time before the earliest deviation time, (2) or finding a power request reservation which starts before the earliest time, and does not exceed the lower limit value of the total power amount even if the power of the unit amount is subtracted from the total request power amount at the present time, and subtracting the power of the unit amount at a time before the earliest time.

* * * * *